United States Patent
Zhang

(10) Patent No.: US 12,531,288 B2
(45) Date of Patent: Jan. 20, 2026

(54) IMMERSION COOLING BATTERY ARRAY DESIGNS FOR ELECTRIFIED VEHICLE BATTERY PACKS

(71) Applicant: Ford Global Technologies, LLC, Dearborn, MI (US)

(72) Inventor: Xiaogang Zhang, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 567 days.

(21) Appl. No.: 18/083,677

(22) Filed: Dec. 19, 2022

(65) Prior Publication Data

US 2024/0204281 A1 Jun. 20, 2024

(51) Int. Cl.
| | |
|---|---|
| *H01M 10/613* | (2014.01) |
| *B60K 1/00* | (2006.01) |
| *B60K 1/04* | (2019.01) |
| *H01M 10/656* | (2014.01) |
| *H01M 10/6567* | (2014.01) |
| *H01M 50/209* | (2021.01) |
| *H01M 50/271* | (2021.01) |
| *H01M 50/289* | (2021.01) |

(52) U.S. Cl.
CPC ....... *H01M 10/613* (2015.04); *H01M 10/656* (2015.04); *H01M 10/6567* (2015.04); *H01M 50/209* (2021.01); *H01M 50/271* (2021.01); *H01M 50/289* (2021.01); *B60K 2001/005* (2013.01); *B60K 1/04* (2013.01); *H01M 2220/20* (2013.01)

(58) Field of Classification Search
None
See application file for complete search history.

(56) References Cited

U.S. PATENT DOCUMENTS

| 5,518,841 A | 5/1996 | Sotomura et al. |
|---|---|---|
| 8,530,069 B2 | 9/2013 | Wood et al. |
| 2011/0027631 A1* | 2/2011 | Koenigsmann ... H01M 10/6567 429/62 |

(Continued)

FOREIGN PATENT DOCUMENTS

| CN | 108183280 A | * | 6/2018 | ........ H01M 10/6556 |
|---|---|---|---|---|
| CN | 210866420 U | | 6/2020 | |

(Continued)

OTHER PUBLICATIONS

Machine Translation of CN-108183280-A (Year: 2018).*
Machine Translation of WO-2021122430-A1 (Year: 2021).*

*Primary Examiner* — Gregg Cantelmo
(74) *Attorney, Agent, or Firm* — David B. Kelley; Carlson, Gaskey & Olds, P.C.

(57) ABSTRACT

This disclosure relates generally to battery packs, and more particularly to battery packs with immersion cooled battery arrays. In some aspects, the techniques described herein relate to a battery pack, including: an enclosure assembly including a cover, wherein the cover includes an inlet configured to receive non-conductive fluid, and wherein the cover includes a wall including a plurality of perforations configured to disperse the non-conductive fluid; and a battery array housed inside the enclosure assembly, wherein the battery pack is configured such that the non-conductive fluid dispersed by the wall of the cover is directed to the battery array.

15 Claims, 6 Drawing Sheets

(56) References Cited

U.S. PATENT DOCUMENTS

| | | | | |
|---|---|---|---|---|
| 2014/0162099 A1* | 6/2014 | Dibos | ............... | H01M 10/63 |
| | | | | 429/90 |
| 2017/0125858 A1* | 5/2017 | Miller | ............. | H01M 10/625 |
| 2017/0125860 A1* | 5/2017 | Chatroux | ......... | H01M 50/213 |

FOREIGN PATENT DOCUMENTS

| | | | | |
|---|---|---|---|---|
| CN | 107039703 B | | 11/2021 | |
| CN | 114175360 A | | 3/2022 | |
| DE | 102012220537 B4 | | 1/2022 | |
| WO | WO-2021122430 A1 | * | 6/2021 | ......... H01M 10/625 |

* cited by examiner

IMMERSION COOLING BATTERY ARRAY DESIGNS FOR ELECTRIFIED VEHICLE BATTERY PACKS

TECHNICAL FIELD

This disclosure relates generally to battery packs, and more particularly to battery packs with immersion cooled battery arrays.

BACKGROUND

The need to reduce automotive fuel consumption and emissions is well known. Therefore, vehicles are being developed that reduce or completely eliminate reliance on internal combustion engines. Electrified vehicles are one type of vehicle being developed for this purpose. In general, electrified vehicles differ from conventional motor vehicles because they are selectively driven by battery powered electric machines. Conventional motor vehicles, by contrast, rely exclusively on an internal combustion engine to propel the vehicle.

A high voltage battery pack typically powers the electric machines and other electrical loads of the electrified vehicle. The battery pack includes a plurality of battery cells and various other battery internal components that support electric propulsion of electrified vehicles.

The battery cells generate heat during charging and discharging operations. This heat must be dissipated in order to achieve a desired level of battery performance. Heat exchanger plates, sometimes referred to as "cold plates," are often employed to dissipate the heat generated by the battery cells.

SUMMARY

In some aspects, the techniques described herein relate to a battery pack, including: an enclosure assembly including a cover, wherein the cover includes an inlet configured to receive non-conductive fluid, and wherein the cover includes a wall including a plurality of perforations configured to disperse the non-conductive fluid; and a battery array housed inside the enclosure assembly, wherein the battery pack is configured such that the non-conductive fluid dispersed by the wall of the cover is directed to the battery array.

In some aspects, the techniques described herein relate to a battery pack, wherein the wall of the cover is a bottom wall of the cover.

In some aspects, the techniques described herein relate to a battery pack, wherein: the enclosure assembly includes a tray connected to the cover, and the tray includes a bottom wall, a first side wall, a second side wall opposite the first side wall, a first end wall, and a second end wall opposite the first end wall.

In some aspects, the techniques described herein relate to a battery pack, further including: a holder assembly configured such that cells of the battery array are spaced-apart from the bottom wall of the tray.

In some aspects, the techniques described herein relate to a battery pack, wherein the holder assembly is configured such that cells of the battery array are spaced-apart from adjacent cells of the battery array.

In some aspects, the techniques described herein relate to a battery pack, wherein the holder assembly is configured such that the cells of the battery array are spaced-apart from the bottom wall of the cover.

In some aspects, the techniques described herein relate to a battery pack, wherein the holder assembly is configured such that the cells of the battery array are spaced-apart from each of the bottom wall of the cover, the bottom wall of the tray, the first side wall of the tray, the second side wall of the tray, the first end wall of the tray, and the second end wall of the tray.

In some aspects, the techniques described herein relate to a battery pack, wherein the cover includes a top wall, a first side wall, a second side wall opposite the first side wall, a first end wall, and a second end wall.

In some aspects, the techniques described herein relate to a battery pack, wherein the cover includes a plenum downstream of the inlet and upstream of the bottom wall of the cover.

In some aspects, the techniques described herein relate to a battery pack, wherein the perforations are through-holes extending through an entirety of the bottom wall of the cover.

In some aspects, the techniques described herein relate to a battery pack, wherein each perforation is substantially circular when viewed along a central axis of the perforation.

In some aspects, the techniques described herein relate to a battery pack, wherein the perforations are formed by drilling.

In some aspects, the techniques described herein relate to a battery pack, wherein each perforation is substantially rectangular when viewed along a central axis of the perforation.

In some aspects, the techniques described herein relate to a method, including: dispersing non-conductive coolant within a battery pack before the non-conductive coolant reaches a battery array using a wall of a cover of an enclosure assembly, wherein the wall of the cover is perforated.

In some aspects, the techniques described herein relate to a method, further including: expelling the non-conductive coolant from an outlet formed in a tray of the battery array, wherein the tray is connected to the cover.

In some aspects, the techniques described herein relate to a method, further including: directing the non-conductive coolant between cells of the battery array, and between the walls of the tray and the battery array.

In some aspects, the techniques described herein relate to a method, further including: introducing the non-conductive coolant into the battery pack via an inlet formed in the cover.

In some aspects, the techniques described herein relate to a method, further including: directing the non-conductive coolant through a plenum downstream of the inlet and upstream of the wall of the cover.

In some aspects, the techniques described herein relate to a method, wherein the perforations are through-holes extending through an entirety of the wall of the cover.

In some aspects, the techniques described herein relate to a method, wherein each perforation is substantially circular or substantially rectangular when viewed along a central axis of the perforation.

DETAILED DESCRIPTION

This disclosure relates generally to battery packs, and more particularly to battery packs with immersion cooled battery arrays Among other benefits, which will be appreciated from the below description, this disclosure evenly distributes coolant relative to the cells of a battery array, which provides uniform heat transfer amongst the cells and leads to efficient heat transfer within the battery array.

Figure 1:
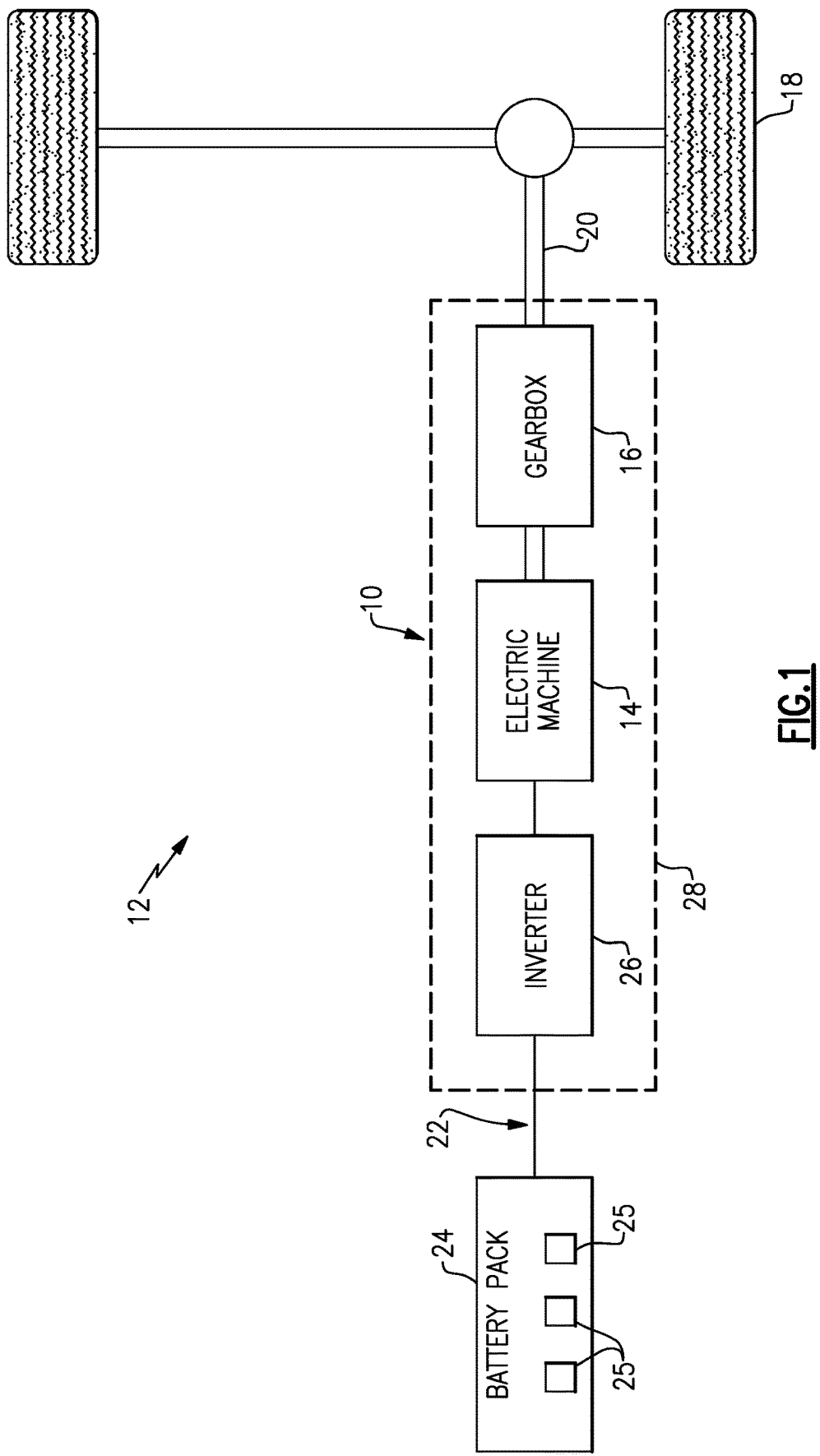
FIG. 1 schematically illustrates an example powertrain of an electrified.

FIG. 1 schematically illustrates a powertrain 10 of an electrified vehicle 12. Although depicted as a battery electric vehicle (BEV), it should be understood that the concepts described herein are not limited to BEVs and could extend to other electrified vehicles, including but not limited to, plug-in hybrid electric vehicles (PHEVs). Therefore, although not shown in this embodiment, the electrified vehicle 12 could be equipped with an internal combustion engine that can be employed in combination with other energy sources to propel the electrified vehicle 12.

In a non-limiting embodiment, the electrified vehicle 12 is a full electric vehicle propelled solely through electric power, such as by an electric machine 14, without any assistance from an internal combustion engine. The electric machine 14 may operate as an electric motor, an electric generator, or both. The electric machine 14 receives electrical power and provides a rotational output power. The electric machine 14 may be connected to a gearbox 16 for adjusting the output torque and speed of the electric machine 14 by a predetermined gear ratio. The gearbox 16 is connected to a set of drive wheels 18 by an output shaft 20. A high voltage bus 22 electrically connects the electric machine 14 to a battery pack 24 through an inverter 26. The electric machine 14, the gearbox 16, and the inverter 26 may collectively be referred to as a transmission 28.

The battery pack 24 is an exemplary electrified vehicle battery. The battery pack 24 may be a high voltage traction battery pack that includes a plurality of battery assemblies 25 (i.e., battery arrays or groupings of battery cells) capable of outputting electrical power to operate the electric machine 14 and/or other electrical loads of the electrified vehicle 12. Other types of energy storage devices and/or output devices can also be used to electrically power the electrified vehicle 12.

The powertrain 10 shown in FIG. 1 is highly schematic and is not intended to limit this disclosure. Various additional components could alternatively or additionally be employed by the powertrain 10 within the scope of this disclosure.

Figure 2:
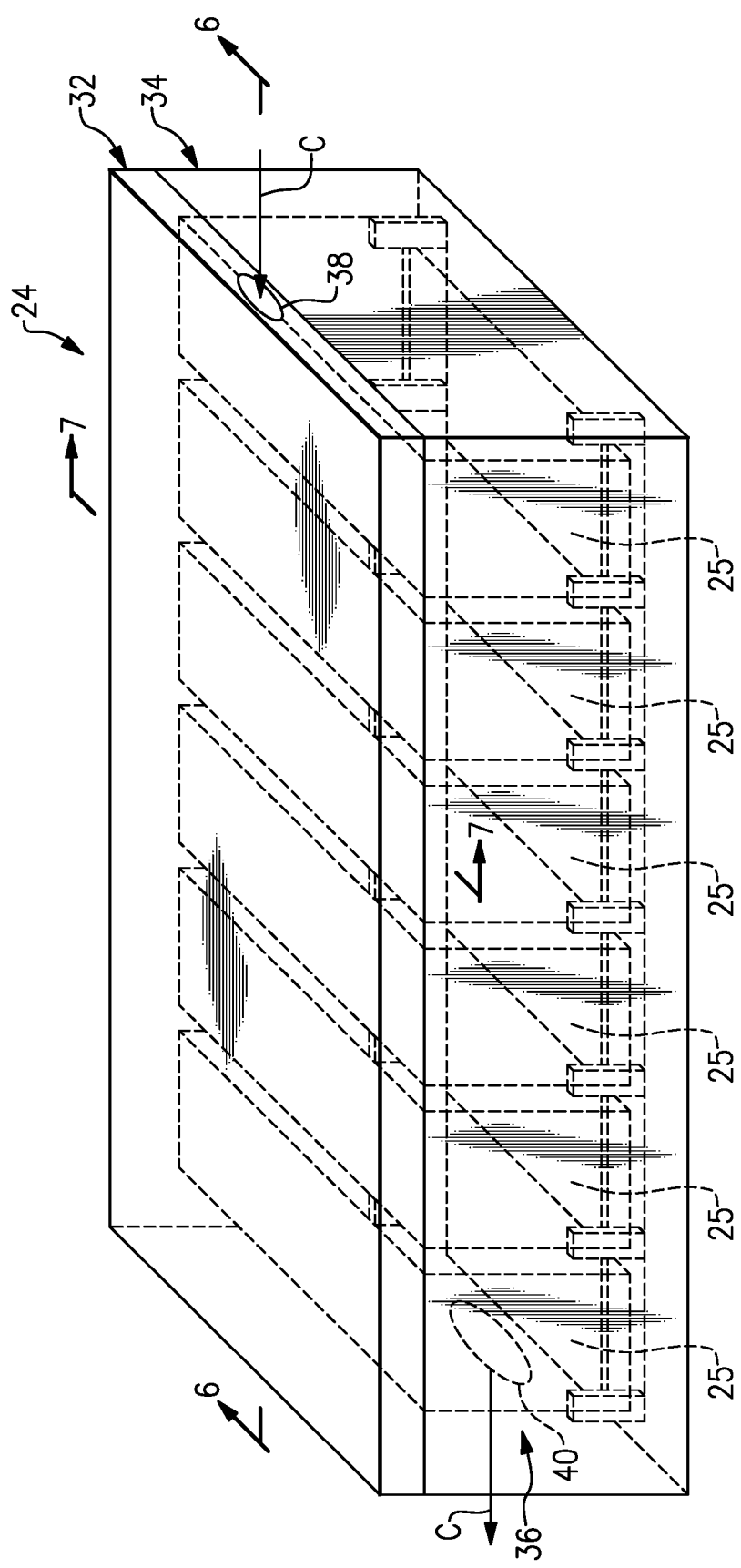
FIG. 2 is a perspective view of an example battery pack.

FIG. 2 illustrates additional detail of the example battery pack 24. In this example, the battery pack 24 includes an enclosure assembly 30. The enclosure assembly 30 includes a cover 32 and a tray 34. The cover 32, in this example, is vertically above the tray 34. In other examples, however, the cover 32 could be arranged below, or to a side of the tray 34. Various terms such as "above," "below," "top," and "bottom" are used relative to the arrangement of the cover 32 and tray 34 in the various drawings and should not otherwise be deemed limiting.

The cover 32 is welded to the tray 34 in one example of this disclosure. While welding is mentioned, the cover 32 and tray 34 could be connected using other fluid-tight connection techniques, such as adhesive. Further, while an exemplary enclosure assembly 30 is shown in the drawings, the enclosure assembly 30 may vary in size, shape, and configuration within the scope of this disclosure.

In this disclosure, an array 36 (i.e., a "battery array") of battery cells 25 is arranged within the battery pack 24. The battery cells 25 are stacked side-by-side to construct the array 36. The battery pack 24 could employ any number of battery cells 25 within the scope of this disclosure. Thus, this disclosure is not limited to the exact configuration shown in FIG. 2. For example, while the battery cells 25 of FIG. 2 are positioned side-by-side relative to one another, other configurations are also contemplated within the scope of this disclosure, including but not limited to embodiments in which the battery cells 25 are stacked on top of one another, for example.

In an embodiment, the battery cells 25 are prismatic, lithium-ion cells. However, battery cells having other geometries (cylindrical, pouch, etc.), other chemistries (nickel-metal hydride, lead-acid, etc.), or both could alternatively be utilized within the scope of this disclosure.

In FIG. 2, the array 36 is arranged within the tray 34 and beneath the cover 32. The battery pack 24 is configured to direct non-conductive coolant C relative to the array 36 to thermally condition the array 36, such as by absorbing heat from the array 36. The coolant C may be referred to as thermal exchange fluid. In this example, the coolant C generally flows from an inlet 38, which is formed in the cover 32, to an outlet 40, which is formed in the tray 34 at an opposite end of the enclosure assembly 30 as the inlet 38.

Figure 3:
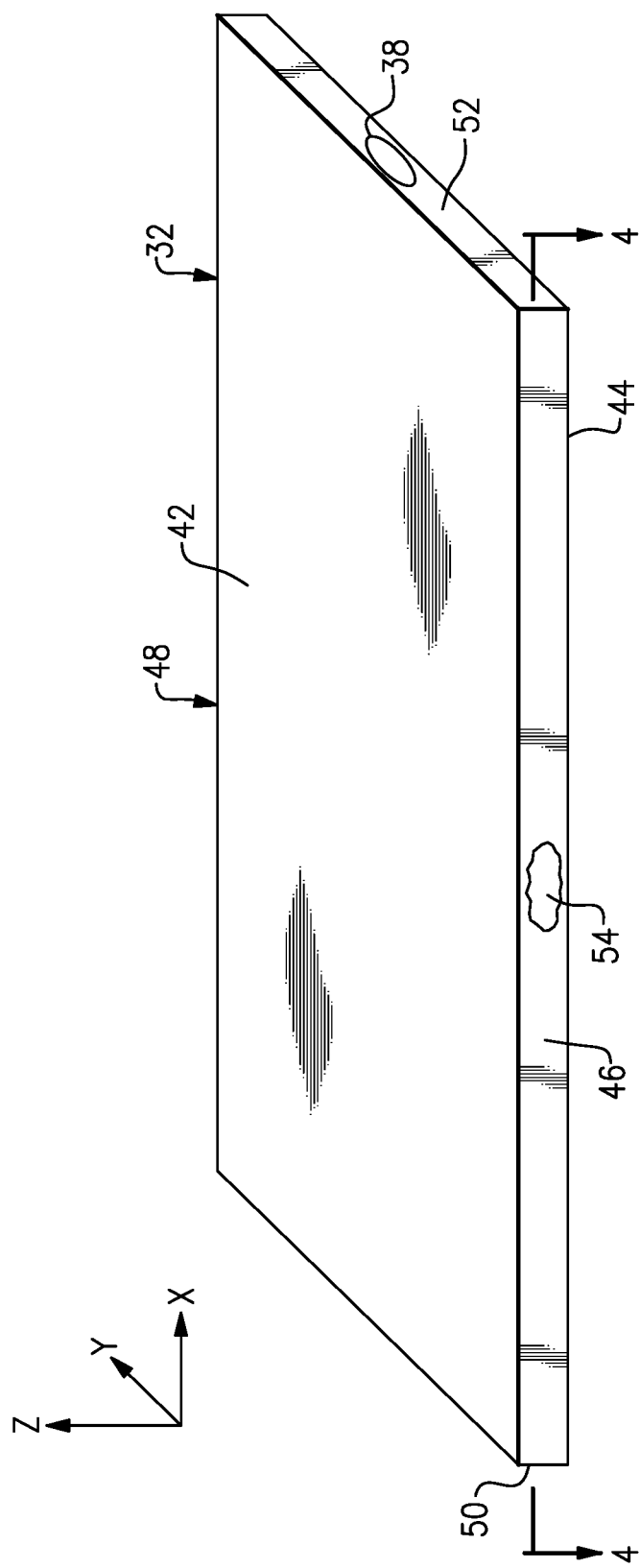
FIG. 3 is a perspective view of an example cover.

With reference to FIG. 3, the cover 32 includes a top wall 42, a bottom wall 44 opposite the top wall 42, a first side wall 46, a second side wall 48 opposite the first side wall 46, a first end wall 50, and a second end wall 52 opposite the first end wall 50. The top and bottom walls 42, 44 are spaced-apart from one another by the first side wall 46, second side wall 48, first end wall 50, and second end wall 52. Further, the top and bottom walls 42, 44 are connected to respective top and bottom edges of each of the first side wall 46, second side wall 48, first end wall 50, and second end wall 52.

In this example, the top wall 42, first side wall 46, second side wall 48, and first end wall 50 are each solid, fluid-tight structures. The second end wall 52 is a solid, fluid-tight structure with the exception of the inlet 38, which is formed through the second end wall 52. Various fluid couplings may be provided relative to the inlet 38. The walls of the cover 32 may be provided by sheets of metal, such as metallic plates, which are welded together, for example. The cover 32 is substantially hollow such that a plenum 54 (visible through partial break in first side wall 46, shown in FIG. 3 for purposes of illustration only) is provided in the interior of the cover 32.

Coolant C flowing into the inlet 38 enters the plenum 54. The coolant C, in this example, flows through the bottom wall 44 before reaching the array 36. The bottom wall 44 is configured to disperse the coolant C evenly relative to the array 36. In this example, the bottom wall 44 includes a plurality of perforations.

Figures 4A, 4B:
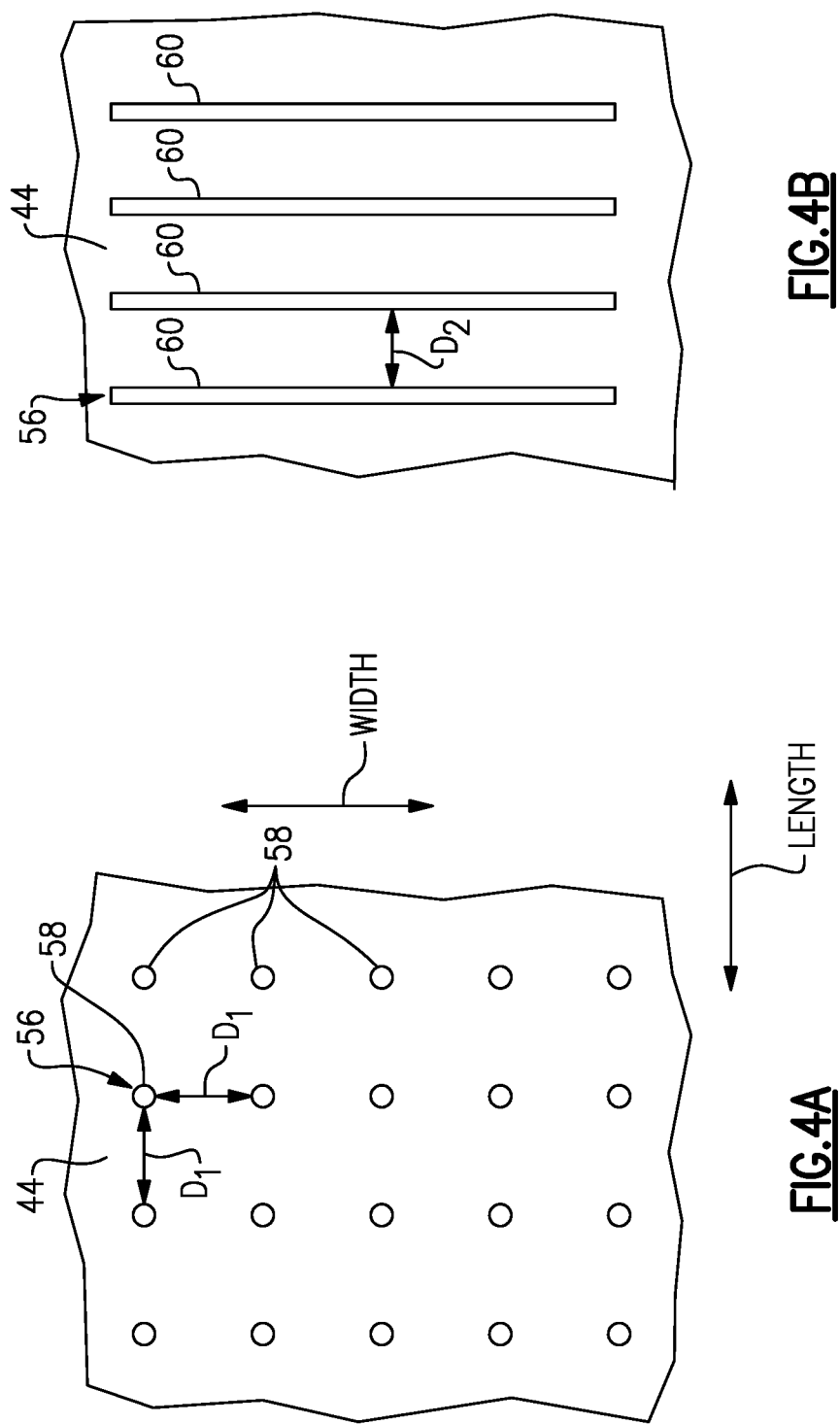
FIG. 4A is a first example arrangement of perforations of the bottom wall of the cover.
FIG. 4B is a second example arrangement of perforations of the bottom wall of the cover.

FIG. 4A illustrates one example arrangement of perforations 56 in the bottom wall. In this example, perforations are provided as a plurality of through-holes 58 (only some are labeled in FIG. 4A) which are substantially circular-shaped when viewed along the central axis of each of the through-holes 58. The central axes of the through-holes 58 run in-and-out of the page, relative to FIG. 4A. The through-holes 58 may be formed by drilling, in an example. The through-holes 58 extend through an entirety of the bottom wall 44 such that fluid can pass through the through-holes 58 from a location above the bottom wall 44 to a location below the bottom wall 44. The through-holes 58 are evenly spaced-apart from one another by a common distance $D_1$ in both the width and length directions of the bottom wall 44, as shown in FIG. 4A. The width direction, which runs between side walls 46, 48, and the length direction, which runs between end walls 50, 52 are labeled for ease of reference. In some embodiments, the through-holes 58 could be spaced-apart by different distances in the length and width directions.

FIG. 4B illustrates another example arrangement of perforations 56. In this example, the perforations are formed as through-holes 60 which permit fluid to pass through the bottom wall 44 and are substantially rectangular-shaped when viewed along the central axis of each of the through-holes 60. The through-holes 60 are arranged such that a greater dimension of the through-holes extends in the width direction of the bottom wall 44. The through-holes 60 could be arranged such that the greater dimension extends in the length direction of the bottom wall 44, however. Further, adjacent through-holes 60 are spaced-apart from one another by a common distance $D_2$. The through-holes 60 could be spaced apart by varying distances in other examples, however.

While the perforations of the bottom wall 44 are shown as circular-shaped and rectangular-shaped through-holes, this disclosure is not limited to only these two example shapes. Further, the bottom wall 44 could include perforations of different types of shapes (e.g., some circle-shaped, and some rectangular-shaped).

Figure 5:
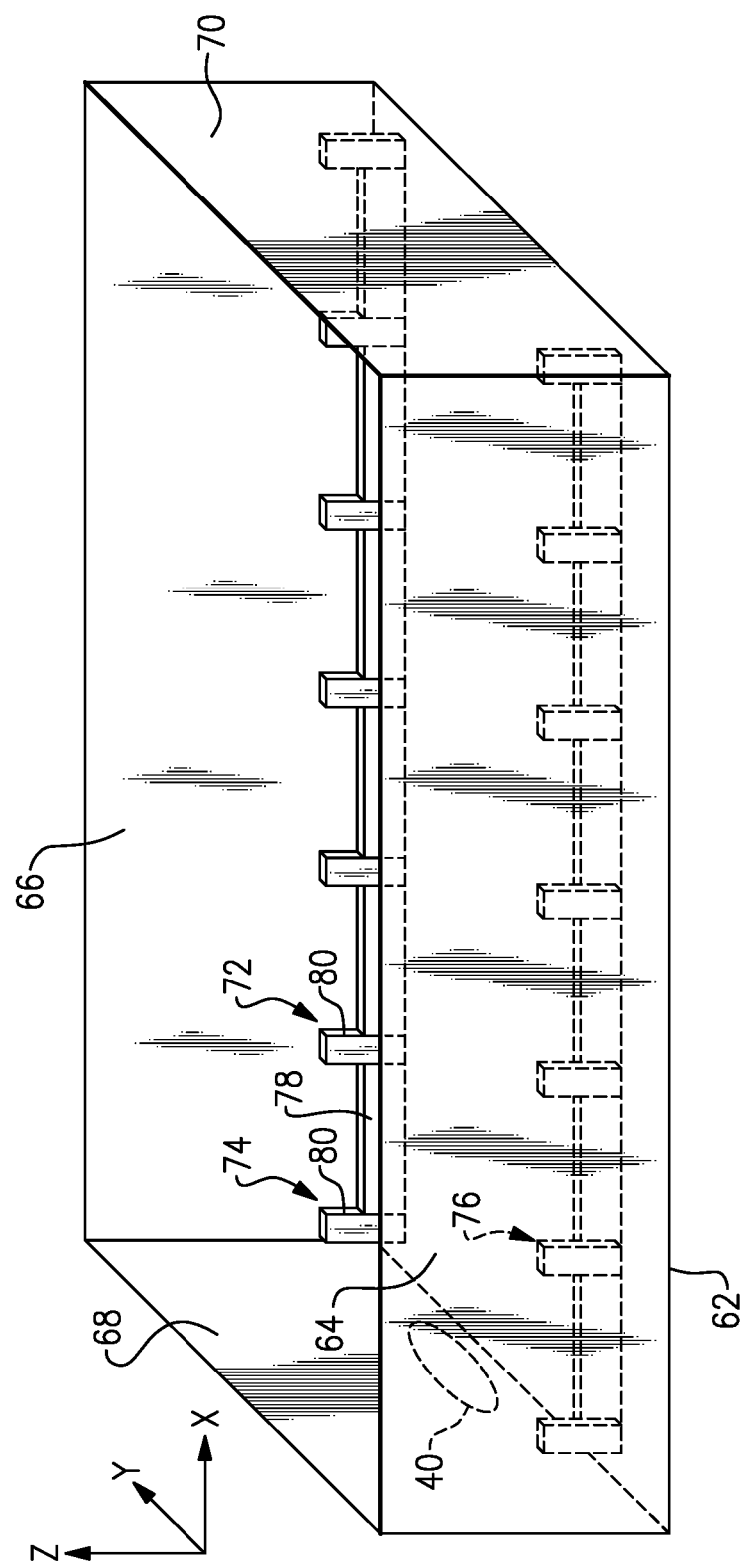
FIG. 5 is a perspective view of an example tray.

With reference to FIG. 5, the tray 34 includes a bottom wall 62, a first side wall 64, a second side wall 66 opposite the first side wall 64, a first end wall 68, and a second end wall 70 opposite the first end wall 68. The bottom wall 62 is connected to bottom edges of the first side wall 64, the second side wall 66, the first end wall 68, and the second end wall 70. In this example, tray 34 does not include a top wall. Rather, the top of the tray 34 is provided by the bottom wall 44 of the cover 32.

The bottom wall 62, first side wall 64, second side wall 66, and second end wall 70 are each solid, fluid-tight structures. The first end wall 68 is a solid, fluid-tight structure with the exception of the outlet 40, which is formed through the first end wall 68. Various fluid couplings may be provided relative to the outlet 40. The various walls of the tray 34 may be provided by sheets of metal. The tray 34 is substantially hollow such that the array 36 can be arranged within the tray 34.

The battery pack 24, and in particular the tray 34, in this example includes a holder assembly 72 configured to hold the battery cells 25 and to space the battery cells 25 apart from one another and the various walls of the battery pack 24 such that coolant C can readily flow around each of the battery cells 25.

In this example, the holder assembly 72 includes a first strip 74 and a second strip 76 extending between the end walls 68, 70 and spaced-apart from one another relative to the dimension between side walls 64, 66. With reference to the first strip 74, the first strip 74 includes a plurality of horizontal segments 78 and vertical segments 80. The horizontal and vertical segments 78, 80 could be integrally or separately formed. A bottom of the horizontal segments 78 directly contacts the bottom wall 64 and a top of the horizontal segments 78 is configured to directly contact a bottom of one of the battery cells 25. In this way, the horizontal segments 78 space the battery cells 25 from the bottom wall 64. The vertical segments 80 each directly contacts one of the battery cells 25 and either another cell or one of the end walls 68, 70. In this way, the vertical segments permit fluid to flow between the cells. It should be understood that the first strip 74 is arranged substantially similar to the second strip 76.

The holder assembly 72 is only shown relative to the bottom wall 64, however, the holder assembly 72 could include similar strips arranged relative to the end walls 68, 70, side walls 64, 66, and/or the bottom wall 44, which would each serve to hold the battery cells 25, space the battery cells 25 apart from one another, and to space the battery cells 25 apart from the respective end walls 68, 70, side walls 64, 66, and bottom wall 44. Various other spacers could be provided relative to the battery cells 25 in addition to or as an alternative to the illustrated holder assembly 72.

Figure 7:
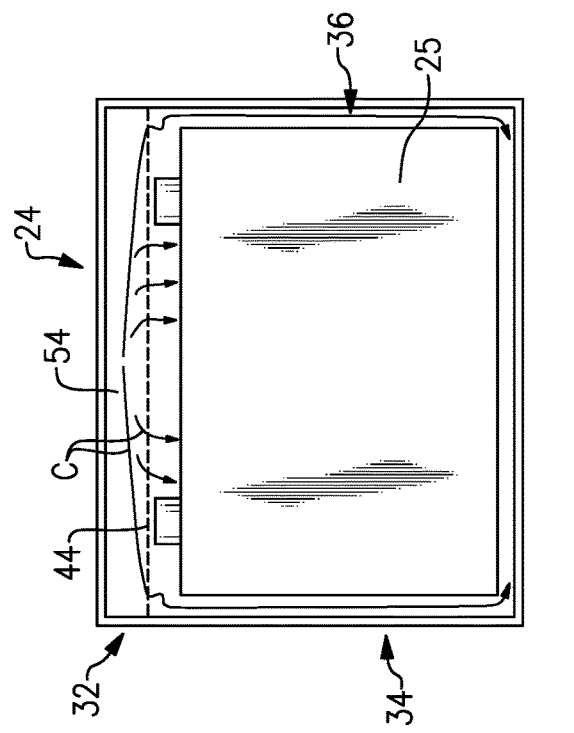
FIG. 7 is a cross-sectional view taken along line 7-7 from FIG. 2, and illustrates coolant flowing relative to the battery pack.
Figure 6:
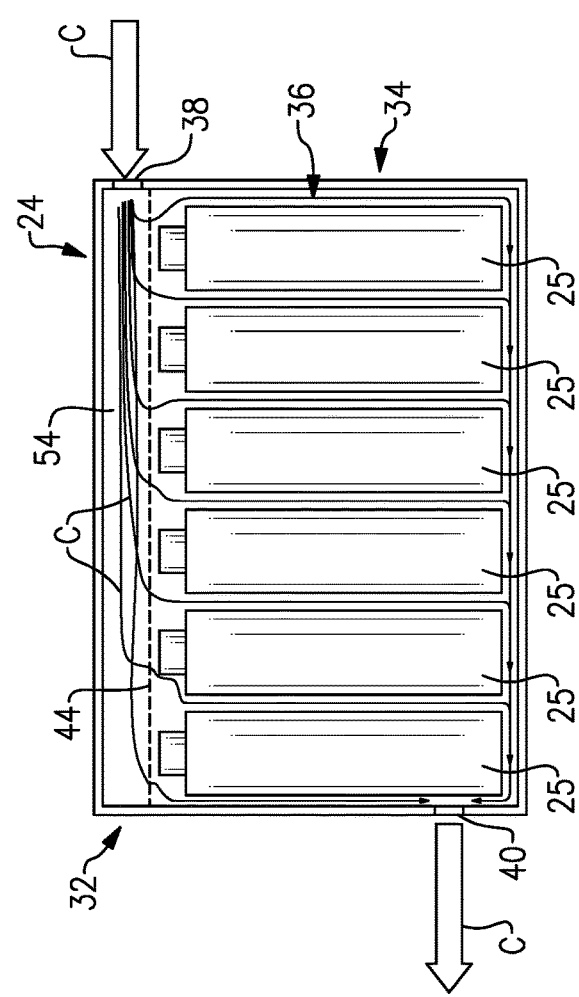
FIG. 6 is a cross-sectional view taken along line 6-6 from FIG. 2, and illustrates coolant flowing relative to the battery pack.

FIGS. 6 and 7 are cross-sectional views of the battery pack 24, with the various holder assemblies removed for ease of reference, and illustrate an exemplary manner in which the coolant C flows relative to the battery cells 25 to thermally condition the cells. By virtue of the arrangement of the inlet 38, plenum 54, and bottom wall 44, the coolant C is evenly dispersed relative to the battery cells 25, which provides for uniform heat transfer amongst the battery cells 25, and in turn leads efficient heat transfer within the array 36. Downstream of the battery cells 25, the coolant C flows out the outlet 40.

The non-conductive coolant C may be a dielectric fluid designed for immersion cooling the battery cells 25. One suitable non-conductive fluid is a Novek™ engineered fluid sold by 3M™. However, other non-conductive fluids may also be suitable, and the actual chemical make-up and design characteristics (e.g., dielectric constant, maximum breakdown strength, boiling point, etc.) may vary depending on the environment the array 36 is to be employed within. Unlike the conductive glycol utilized within known cold plate systems, the non-conductive fluid received inside the immersion cooled battery arrays of this disclosure allows for direct contact with the battery cells and other electrified components without causing electrical shorts, thereby improving cooling and performance. The exemplary immersion cooling strategies further enable high rate charging and discharging and allow for high load demands without increasing the hardware size of the battery arrays.

It should be understood that terms such as "about," "substantially," and "generally" are not intended to be boundaryless terms, and should be interpreted consistent with the way one skilled in the art would interpret those terms. It should also be understood that directional terms such as "upper," "top," "vertical," "forward," "rear," "side," "above," "below," etc., are used herein relative to the normal operational attitude of a vehicle for purposes of explanation only, and should not be deemed limiting.

Although the different examples have the specific components shown in the illustrations, embodiments of this disclosure are not limited to those particular combinations. It is possible to use some of the components or features from one of the examples in combination with features or components from another one of the examples. In addition, the various figures accompanying this disclosure are not necessarily to scale, and some features may be exaggerated or minimized to show certain details of a particular component or arrangement.

One of ordinary skill in this art would understand that the above-described embodiments are exemplary and non-limiting. That is, modifications of this disclosure would come within the scope of the claims. Accordingly, the following claims should be studied to determine their true scope and content.

The invention claimed is:

1. A battery pack, comprising:
an enclosure assembly including a cover, wherein the cover includes an inlet configured to receive electrically non-conductive fluid, wherein the cover includes a wall including a plurality of perforations configured to disperse the electrically non-conductive fluid, wherein the enclosure assembly includes a tray connected to the cover, wherein the tray exhibits a length and a width;
a battery array housed inside the enclosure assembly, wherein the battery pack is configured such that the electrically non-conductive fluid dispersed by the wall of the cover is directed to the battery array; and
a holder assembly configured such that battery cells of the battery array are spaced-apart from a bottom wall of the tray such that a gap is formed between a bottom of each of the battery cells and a top of a bottom wall of the tray, wherein the gap extends in a direction parallel to the length of the tray, and wherein the electrically non-conductive fluid is able to flow through the gap in the direction parallel to the length of the tray.

2. The battery pack as recited in claim 1, wherein the wall of the cover is a bottom wall of the cover.

3. The battery pack as recited in claim 2, wherein:
the tray includes the bottom wall, a first side wall, a second side wall opposite the first side wall, a first end wall, and a second end wall opposite the first end wall.

4. The battery pack as recited in claim 1, wherein the holder assembly is configured such that cells of the battery array are spaced-apart from adjacent cells of the battery array.

5. The battery pack as recited in claim 1, wherein the holder assembly is configured such that the cells of the battery array are spaced-apart from the bottom wall of the cover.

6. The battery pack as recited in claim 3, wherein the holder assembly is configured such that the cells of the battery array are spaced-apart from each of the bottom wall of the cover, the bottom wall of the tray, the first side wall of the tray, the second side wall of the tray, the first end wall of the tray, and the second end wall of the tray.

7. The battery pack as recited in claim 2, wherein the cover includes a top wall, a first side wall, a second side wall opposite the first side wall, a first end wall, and a second end wall.

8. The battery pack as recited in claim 7, wherein the cover includes a plenum downstream of the inlet and upstream of the bottom wall of the cover.

9. The battery pack as recited in claim 2, wherein the perforations are through-holes extending through an entirety of the bottom wall of the cover.

10. The battery pack as recited in claim 9, wherein each perforation is substantially circular or substantially rectangular when viewed along a central axis of the perforation.

11. The battery pack as recited in claim 1, wherein the battery array extends along a length substantially parallel to the length of the tray.

12. The battery pack as recited in claim 1, wherein the gap extends along substantially an entire length of the tray.

13. The battery pack as recited in claim 1, wherein the holder assembly further comprises:
a first strip and a second strip, wherein the first strip and the second strip extend substantially parallel to one another along the length of the tray between end walls of the enclosure assembly and are spaced-apart from one another relative to the width of the tray, wherein each of the first and second strips comprises at least one horizontal segment and at least one vertical segment, wherein the horizontal segments directly contact a bottom wall of the tray and are configured to support battery cells thereon so as to space the battery cells from the bottom wall of the tray, and wherein the vertical segments directly contact the battery cells and either another cell or one of the end walls of the tray to permit the electrically non-conductive fluid to flow between the battery cells and between a bottom of the battery cells and a top of the bottom wall of the tray in a direction parallel to the length of the tray.

14. The battery pack as recited in claim 13, wherein the gap exhibits a height substantially equal to a height of the horizontal segments, a width substantially equal to a distance by which the first and second strips are spaced-apart from one another, and a length substantially equal to a length of the first and second strips.

15. A battery pack, comprising:
an enclosure assembly including a cover, wherein the cover includes an inlet configured to receive an electrically non-conductive fluid, wherein the cover includes a wall with a plurality of perforations configured to disperse the electrically non-conductive fluid, wherein the enclosure assembly includes a tray connected to the cover, wherein the tray exhibits a length and a width;
a battery array housed inside the enclosure assembly, wherein the battery pack is configured such that the electrically non-conductive fluid dispersed by the wall of the cover is directed to the battery array; and
a holder assembly including a first strip and a second strip, wherein the first strip and the second strip extend substantially parallel to one another along the length of the tray between end walls of the enclosure assembly and are spaced-apart from one another relative to the width of the tray, wherein each of the first and second strips comprises at least one horizontal segment and at least one vertical segment, wherein the horizontal segments directly contact a bottom wall of the tray and are configured to support battery cells of the battery array thereon so as to space the battery cells from the bottom wall of the tray, and wherein the vertical segments directly contact the battery cells and either another cell or one of the end walls of the tray to permit the electrically non-conductive fluid to flow between the battery cells and between a bottom of the battery cells and a top of the bottom wall of the tray in a direction parallel to the length of the tray.

\* \* \* \* \*